US006850984B1

(12) United States Patent
Kalkunte et al.

(10) Patent No.: US 6,850,984 B1
(45) Date of Patent: Feb. 1, 2005

(54) SYSTEM FOR ISOLATING OTHER CLIENTS THAT EXPERIENCE DIFFERENT CONNECTION PERFORMANCE THAN THE CLIENT AND DIRECTING THE OTHER CLIENTS TO ANOTHER DIFFERENT MIRRORED SERVER

(75) Inventors: Suresh S. Kalkunte, Marlborough, MA (US); Cary A. Jardin, San Diego, CA (US); James J. Finucane, Lexington, MA (US); John A. Shriver, Arlington, MA (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 09/658,210

(22) Filed: Sep. 8, 2000

(51) Int. Cl.[7] ............................................... G06F 15/16
(52) U.S. Cl. ........................ 709/229; 709/227; 718/105
(58) Field of Search ................................. 709/229, 227, 709/216, 200, 220, 225; 718/105; 370/401; 707/8; 379/220.01

(56) References Cited

U.S. PATENT DOCUMENTS

| | | | | |
|---|---|---|---|---|
| 6,052,683 | A | * | 4/2000 | Irwin ............................. 707/8 |
| 6,104,717 | A | * | 8/2000 | Coile et al. .................. 370/401 |
| 6,134,316 | A | * | 10/2000 | Kallioniemi et al. .. 379/220.01 |
| 6,167,438 | A | * | 12/2000 | Yates et al. ................... 709/216 |
| 6,185,598 | B1 | | 2/2001 | Farber et al. |
| 6,314,465 | B1 | * | 11/2001 | Paul et al. ................... 709/226 |
| 6,470,389 | B1 | * | 10/2002 | Chung et al. ............... 709/227 |
| 6,665,702 | B1 | * | 12/2003 | Zisapel et al. ............... 718/105 |
| 2001/0003823 | A1 | * | 6/2001 | Mighdoll et al. ............ 709/200 |

OTHER PUBLICATIONS

"IOS Server Load Balancing", Copyright 1989–2000, Cisco Systems Inc., pp. 1–70.
Kevin Delgadillo, "Cisco Distributed Director", Copyright 1999, Cisco Systems Inc., pp. 1–19.
"Scaling the Internet Web Servers", Copyright 1997, Cisco Systems Inc., pp. 1–6.
"Cisco Distributed Director, No. 735", Copyright 1989–1998, Cisco Systems Inc., pp. 1–8.
James D. Guyton et al., "Locating Nearby Copies of Replicated Internet Servers". Computer Communication Review, vol. 25, No. 8, Oct. 1995, pp. 288–298.
Zongming Fei et al., "A Novel Server Selection Technique for Improving the Response Time of a Replicated Service". IEEE INFOCOM '98, vol. 2, Mar. 29–Apr. 2, 1998, pp. 783–791.
Samrat Bhattacharjee et al., "Application–Layer Anycasting". IEEE INFOCOM '97, vol. 3, Apr. 7–12, 1997, pp. 1388–1396.
Semeria, Chuck, "Classless Inter–Domain Routing (CIDR)"; Understanding IP Addressing: Everything you Ever Wanted to Know, www.3com.com/nsc/501302.html , Mar. 10, 2000.

* cited by examiner

Primary Examiner—Le Hien Luu
(74) Attorney, Agent, or Firm—Fish & Richardson P.C.

(57) ABSTRACT

Connecting to a network server includes determining, at a first server, to which one of N mirrored servers a request from a client should be routed based at least in part on an address indicating the client and a route to the client and on the quality of service between at least some of the N mirrored servers to the client and determining to route requests from other clients associated with the address to the one of the N mirrored servers.

25 Claims, 5 Drawing Sheets

SYSTEM FOR ISOLATING OTHER CLIENTS THAT EXPERIENCE DIFFERENT CONNECTION PERFORMANCE THAN THE CLIENT AND DIRECTING THE OTHER CLIENTS TO ANOTHER DIFFERENT MIRRORED SERVER

BACKGROUND

This invention relates to connecting to a network server. Servers handle (send and receive) traffic on networks such as the Internet. Providing and maintaining a sufficient number of capable servers helps handle the increasing number of users and networks connected to the Internet. One way to provide capable servers involves using scalable servers that can adapt to the changing size of the network(s) they serve. Any number of additional servers can supplement the scalable servers to permit a more even distribution of the load that each server handles.

Another tactic for balancing the load among the servers is server mirroring: providing a primary server and any number of backup servers that duplicate the service of the primary server. These mirrored servers, together called a server farm, may be located in different geographic regions, helping users and networks obtain more localized and reliable service. A round robin system may distribute the load among the servers in the server farm by connecting users and/or networks with the servers on a fixed rotating basis. Additionally, a load balancing system can direct users and/or networks to the servers in the server farm based on the amount of traffic each server can potentially handle and its current load.

Whatever the server configuration, servers use a Network Layer address to route different users and networks across a network such as the Internet. For the Internet, Network Layer addresses are Internet Protocol (IP) addresses. An IP address can be expressed in IPv4 (IP version four) as a thirty-two bit numeric address written as four sets (octets) of three numbers ranging from zero to 255, e.g., 100.50.200.150.

For a given host on the Internet, the most significant bits of the IP address represent the network (wire) it is on, and the least significant bits represent the node upon the network. The exact boundary in the IP address between the network and host parts of the address is specific to the individual network. This is known as the "netmask".

IP uses hierarchical addressing. This means that in moving up the routing hierarchy, groups of networks are aggregated into larger groups for purposes of routing. These aggregates are known as "prefixes," and they consist of a set of most significant bits of the address and a number representing the length of the prefix in bits.

Historically, at the top level of the Internet routing hierarchy one could determine the prefix length by examining the most significant bits of the IP address. Up to three of the left-most bits identified the class of a traditional IP address, while the remaining left-most bits identify a particular network (prefix) as shown below:

| Class | Class Bits | Network (Prefix) Bits | Host Bits | Decimal Range of Network Addresses | Decimal Range of Addresses | Number of Supportable Networks | Number of Supportable Hosts per Network |
|---|---|---|---|---|---|---|---|
| A | 1 | 8 | 24 | 0 to 126 | 0.0.1 to 255.255.254 | 126 | 16,777,214 |
| B | 2 | 16 | 16 | 128.0 to 191.255 | 0.1 to 255.254 | 65,384 | 65,534 |
| C | 3 | 24 | 8 | 192.0.0 to 224.255.255 | 1 to 254 | 2,097,152 | 254 |

In the current Internet, the rules for determining a route to a destination have been nearly or completely replaced by a CIDR addressing scheme using the classless inter-domain routing (CIDR) prefix value. The CIDR addressing scheme increases the number of possible IP top-level prefixes by not limiting the number of network bits to eight (class A), sixteen (class B), and twenty-four (class C).

An example of an IP address with a CIDR prefix is 200.50.75.5/16. The prefix length typically ranges from eight to twenty-eight and indicates the number of bits to identify a particular network, leaving the remainder of the bits to identify hosts on that network. Using CIDR prefix to represent a network increases the number of IP networks over traditional class based IP networks as shown below:

| CIDR Prefix | Equivalent Number of Supportable Class C Networks | Number of Supportable Hosts Per Network |
|---|---|---|
| /8 | 65,536 (1 Class A) | 16,777,216 |
| /9 | 32,768 | 8,388,608 |
| /10 | 16,384 | 4,194,304 |
| /11 | 8,192 | 2,097,152 |
| /12 | 4,096 | 1,048,576 |
| /13 | 2,048 | 524,288 |
| /14 | 1,024 | 262,144 |
| /15 | 512 | 131,072 |
| /16 | 256 (1 Class B) | 65,536 |
| /17 | 128 | 32,768 |
| /18 | 64 | 16,384 |
| /19 | 32 | 8,192 |
| /20 | 16 | 4,096 |
| /21 | 8 | 2,048 |
| /22 | 4 | 1,024 |
| /23 | 2 | 512 |
| /24 | 1 | 256 |
| /25 | 1/2 | 128 |
| /26 | 1/4 | 64 |
| /27 | 1/8 | 32 |
| /28 | 1/16 | 16 |

DESCRIPTION

Figure 1:
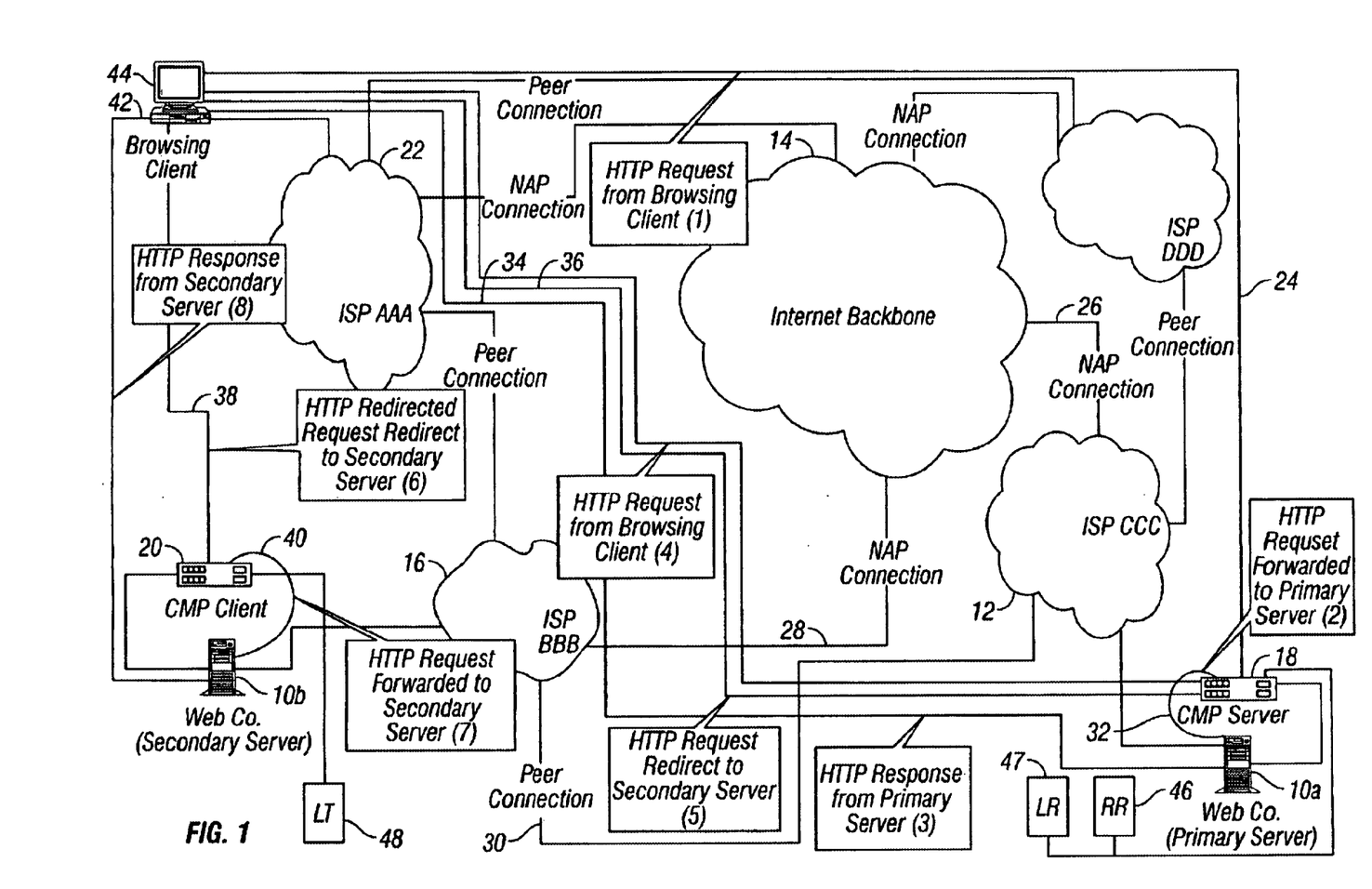
FIG. 1 is a diagram showing a network.

FIG. 1 shows a web company maintaining a server farm that includes a primary web server 10*a*, connected to an Internet network 14 through a network access point (NAP) connection 26 and an Internet service provider (ISP) CCC 12, and a secondary (mirror) web server 10*b*, connected to the Internet network 14 through a NAP connection 28 and an ISP BBB 16. The ISP CCC 12 and the ISP BBB 16 have a peer connection 30, although ISPs hosting web servers in the server farm need not have peer connections. The server farm may include up to N secondary web servers located in the same or different geographic regions as the primary web server 10*a* and the secondary web server 10*b* and connected at/hosted by any number of the same or different ISPs.

A content management protocol server (CMPS) 18 is a hardware and/or software device co-located with and connected in front of the primary web server 10*a*, i.e., requests made by clients to the web company (initially directed to the primary web server 10*a*) first encounter the CMPS 18. The requests may be associated with any kind of protocol, e.g., HTTP (hypertext transfer protocol), TCP (transmission control protocol), and FTP (file transfer protocol). The CMPS 18 determines which one of the web company's web servers 10*a–b* to route (direct or transfer) each request to, possibly with help from a hardware and/or software content management protocol client (CMPC) 20 co-located with and connected in front of the secondary web server 10*b*. The CMPS 18 may also use CMPCs associated with each additional secondary web server.

Determining where to route the requests using the CMPS 18 and CMPC 20 transparently provides clients with quality of service: the most desirable quality of service (fastest connection speed or greatest performance between the client and the point of fulfillment) based on a load balancing approach. The load balancing approach considers the load of each web server 10*a–b* and the bandwidth distance of the web servers 10*a–b* from the clients.

Further, the CMPS 18 and the CMPC 20 consider an address associated with each client trying to access the web company in routing the client requests to the web servers 10*a–b* supported by the web company. The address considered by the CMPS 18 and the CMPC 20 is an address used in a network protocol where the addresses are assigned on a topological basis, e.g., TCP/IP (Transmission Control Protocol/Internet Protocol). Some part of the address provides topologically-or performance-significant information, e.g., a route to a node, i.e., a network, and some part of the address provides topologically- or performance-insignificant information, e.g., the node, i.e., a host on the network.

The division between the significant information and the insignificant information cannot readily be determined by nodes at higher levels of the Internet routing hierarchy. These nodes cannot determine the prefix length (and thus the topologically-significant information) by inspecting a particular IP address because that information gets lost in moving up the routing hierarchy.

Further, the division between the significant information and the insignificant information cannot readily be determined by visually inspecting the address. For example, consider two thirty-two bit IP addresses 161.2.2.35/24 and 161.2.2.35/27. The topologically-significant segment of the IP address differs for these two addresses. For 161.2.2.35/24, the first twenty-four bits are topologically significant, while for 161.2.2.35/27, the first twenty-seven bits are topologically significant. The topologically-significant segment cannot be determined given only the IP address.

At the outset, the CMPS 18 and the CMPC 20 use a well known topologically-significant segment (prefix) of the ISP address, e.g., /16, associated with the incoming client requests and use heuristics to determine where to route the client requests. Over time, the CMPS 18 and the CMPC 20 "learn" which web server 10*a–b* in the server farm provides the most desirable service to a group of clients associated with a prefix using an indicator such as connection speed or performance between the web servers 10*a–b* and the clients (within the aforementioned prefix).

The "learning" procedure includes a round robin procedure that associates a server with a group of clients associated with a prefix value by refining the prefix value such that the clients experience similar performance when served by any one of servers 10*a–b*. The prefix initially used to identify a client typically encompasses a large number of clients, e.g., /16. As time passes, the prefix associating a group of clients may be modified, e.g., from /16 to /24, to reflect similar performance experienced by the clients. The motivation to refine the prefix is when the performance experienced by the clients varies over a certain threshold, e.g., the round trip times between clients in the group and the servers 10*a–b* vary by a certain time value. Requests from clients among the group of clients within a given prefix can be scheduled to different web servers in the server farm in a round robin procedure to determine which of the servers provides the most desirable quality of service to the clients. From the results of the round robin procedure, as described further below, the server that offers the most desirable performance can be determined.

A CIDR prefix is used by the CMPS 18 and the CMPC 20 in determining where to route client requests. The CIDR prefix is indicative of the network address, e.g., 202.25.0.0/16, including bits used to identify a route to a node and the client's network. The CIDR prefix above is shown as thirty-two bits (IPv4), but the CMPS 18 and the CMPC 20 can operate on addresses (CIDR format or not) with any network protocol assigning addresses on a topological basis and use corresponding addresses, e.g., IPv6 (IP version six) addresses. The CMPS 18 can route future client requests coming from the same CIDR prefix as previously routed client requests to a previously determined web server 10*a–b* providing the fastest service for that CIDR prefix. This implies that clients having the same CIDR prefix will experience similar performance when connected to the same web server. However, occasionally inconsistent CIDR prefix performance may result in rerouting the client request to another web server.

Figure 2:
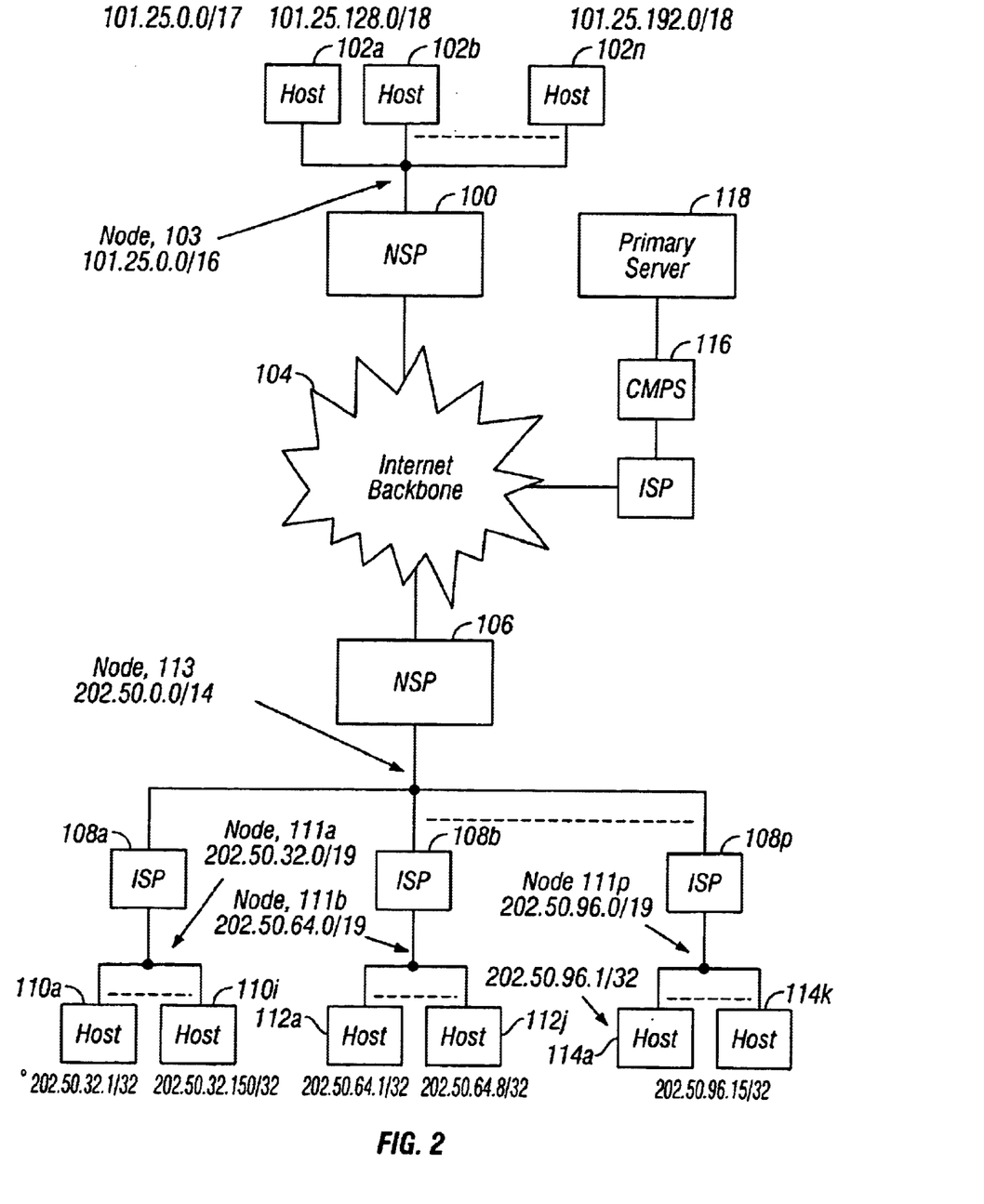
FIG. 2 is a block diagram of a network.

For example, referring to FIG. 2, a first network service provider (NSP) 100 may connect networks 102*a–n* to an Internet backbone 104, and thus each network 102*a–n* can be identified by the same sixteen bit CIDR prefix at a first network node 103. The networks 102*a–n* may apportion/divide their address space between two or more other networks, e.g., the network 102*a* may apportion its address 101.25.17.0/20 between two networks (not shown) as 101.25.19.0/24 and 101.25.17.0/24. If a CMPS 116 determines that a primary web server 118 provides the fastest service to the CIDR prefix at the first network node 103, when the hosts in the network 102a try to connect to the primary web server 116, the CMPS 116 may route the hosts in the network 102a to the primary web server 118. The hosts in the network 102b requesting access to the primary web server 118, however, may experience performance inconsistent with respect to the hosts in the network 102a because of fragmented CIDR prefixes deployed in the Internet backbone 104, e.g., the hosts in the networks 102a–b may both subscribe to the NSP 100 but be geographically separated by thousands of miles.

To accommodate for the inconsistent performance, the CMPS 18 can use one or more factors (metrics) associated with the server farm and the quality of service for the incoming client connection request such as TCP retransmissions and variances in the end-to-end connection, e.g., round-trip time, number of hops, and cost, to isolate CIDR prefix blocks experiencing different performance. These isolated CIDR prefix blocks are regrouped based on the metrics and associated with the web server offering the fastest service for each CIDR prefix block.

Similarly, a second NSP 106 may connect ISPs 108a–p to the Internet backbone 104. Networks 110a–i, 112a–j, and 114a–k connected to their respective ISPs 108a–p each can be identified by the same CIDR prefix at their respective ISP network nodes 111a–p. Accordingly, the second NSP 106 has a CIDR prefix at a second network node 113 that can be associated with all of the ISPs 108a–p. If the CMPS 116 routes the hosts in the network 110a to the primary web server 118 as having the most desirable service, the CMPS 116 may later route hosts in the networks 110b–i to the primary web server 118. However, the CMPS 116 may or may not route hosts in the networks 112a–j and the hosts in the networks 114a–k to the primary web server 118 despite their common CIDR prefix with the network 110a at the second network node 113 depending on the CIDR prefix the CMPS 116 considers for each network 110a–i, 112a–j, and 114a–k and on the consistency of performance for the CIDR prefix at the second network node 113.

Note that smaller prefix lengths indicate more potential hosts and a probable faster rate of resolution. However, because of coarse network granularity, the chance of inconsistent performance across these networks increases. Thus, requests associated with the first network node 103 with a prefix length of sixteen are more likely to experience inconsistent performance than requests associated with the second network node 113 having a prefix length of fourteen.

Figure 3:
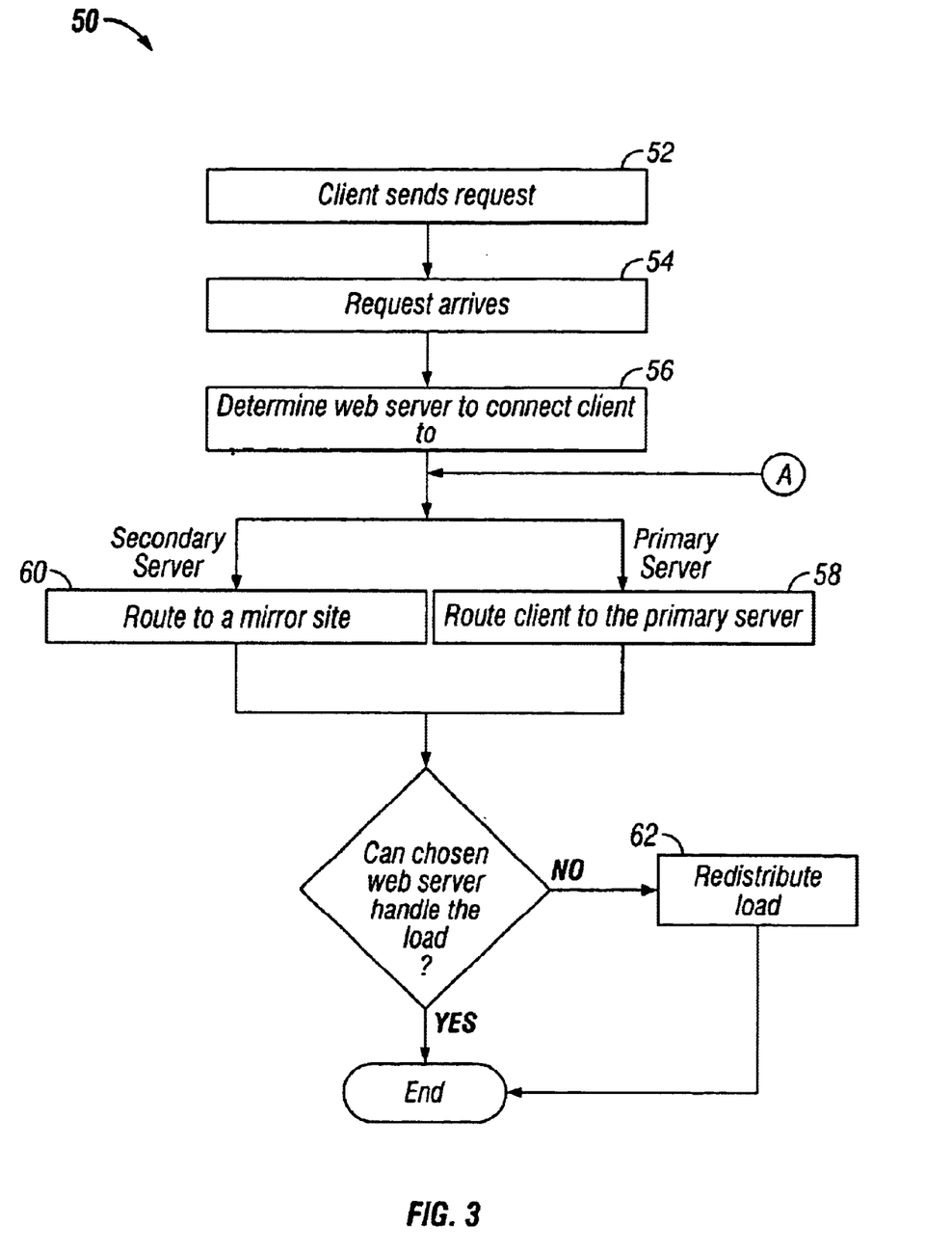
FIGS. 3, 4, and 5 are flowcharts showing how to direct clients to network servers in the network of FIG. 1 in accordance with an embodiment of the invention.

Now referring to FIGS. 1 and 3, a process 50 can provide load balancing of the web company's web content distributed across the web servers 10a–b. A browsing client 44 connected to the Internet network 14 at an ISP AAA 22 may send (52) an HTTP request 24 to the primary server 10a. Every time the browsing client 44 requests access to a web page, linked document, video sequence, image, audio stream, or other material supported by the web company, the browsing client 44 sends (52) an HTTP request 24 to the primary server 10a (actually, the CMPS 18). A single browsing client 44 may send (52) any number of HTTP requests 24 to the web company in the course of a single connection session to the Internet 14 and the web company. Each HTTP request 24 arrives (54) at the CMPS 18 in front of the primary server 10a. The CMPS 18 determines (56) which web server 10a–b to route the HTTP request 24 to in a manner described further below.

If the CMPS 18 chooses (56) the primary web server 10a, the CMPS 18 routes (58) the HTTP request 24 to the primary web server 10a by forwarding (32) the HTTP request 24 to the primary web server 10a, which in turn sends an HTTP response 34 to the browsing client 44. Instead, if the CMPS 18 chooses (56) the secondary web server 10b, the CMPS 18 routes (60) the HTTP request 24 to the secondary web server 10b by sending an HTTP redirect request 36 to the browsing client 44. In response to receiving the HTTP redirect request 36, the browsing client 44 sends a redirected HTTP request 38 to the secondary web server 10b (actually, the CMPC 20). The CMPC 20 forwards (40) the redirected HTTP request 38 to the secondary web server 10b, which sends an HTTP response 42 back to the browsing client 44.

Regardless of which web server 10a–b the CMPS 18 chooses (56), if the chosen web server 10a–b cannot handle the additional load of the browsing client's HTTP request, the CMPS 18 redistributes (62) the load among the web servers 10a–b. One way the CMPS 18 may redistribute the load includes isolating the CIDR prefixes with the greatest granularity (having the most components/clients) connected to the overloaded web server 10a–b and redirecting clients for one or more of these isolated CIDR prefixes to another web server 10a–b in the server farm. The CMPS 18 can use a load balancing system to accomplish this redirecting.

Figure 4:
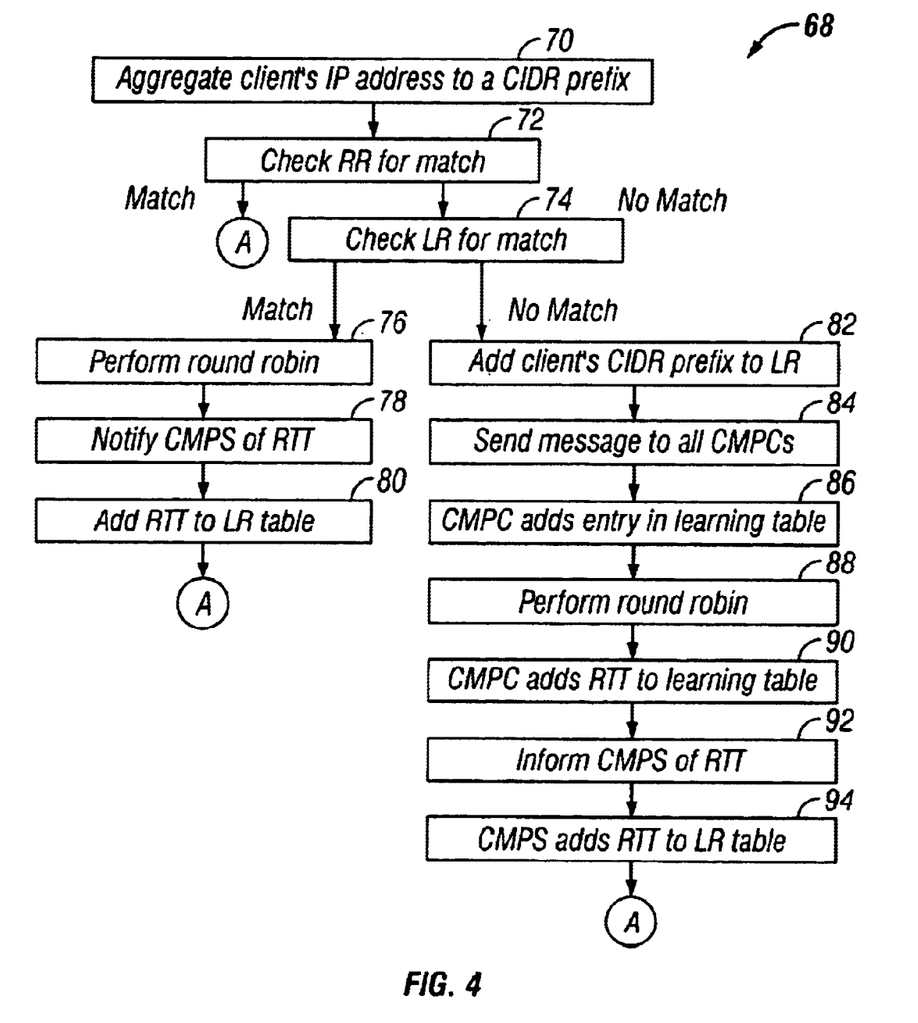

Also referring to FIG. 4, the CMPS 18 determines (56) which web server 10a–b to route the HTTP request 24 to using a process 68. After the HTTP request 24 arrives (54) from the browsing client 44, the CMPS 18 aggregates (70) the browsing client's IP address to a client CIDR prefix to identify the route to the node. As clients encounter the CMPS 18, the CMPS 18 initially uses the highest level performance to aggregate requests from that client and other clients within its vicinity. The prefix (address segment) considered by the CMPS 18 typically encompasses a large number of clients. As time passes, the CMPS 18 "learns," and the prefix that the CMPS 18 considers for making redirect decisions for a client address can change, e.g., increase to a larger number of bits. Changing the prefix (part of the address) considered allows the CMPS 18 to determine over time the prefix (part of an address) it should consider in routing requests to the server that provides the client associated with the request with the most desirable performance. For example, the browsing client's CIDR prefix may identify its NSP or its ISP (see FIG. 2 and discussion above) depending on the browsing client's defined network topology.

Extracting the client CIDR prefix from the source address of the client, the CMPS 18 checks (72) a resolved redirector (RR) table 46 to see if the client CIDR prefix exists in the RR table 46. The RR table 46 is essentially a collection of data stored on or accessible by the CMPS 18 and/or the primary web server 10a. The RR table 46 includes an index of CIDR prefixes and the associated connection metric such as TCP/IP RTTs (round trip times) associated with each CIDR prefix known by each web server. The information in the RR tables 46 indicates a route to a node and an indicator of the connection speed or performance between the client and the points of fulfillment, i.e., each server in the server farm. The point of fulfillment with the fastest connection speed or greatest performance is listed first for each address or partial address. Here, the index includes CIDR prefixes and TCP/IP RTTs associated with each CIDR prefix known by the primary web server 10a and each secondary web server 10b, the web servers 10a–b being listed from fastest connection speed or greatest performance, e.g., smallest RTT, to slowest connection speed or worst performance, e.g., largest RTT. The RR table 46 initially includes well-known prefixes—here, CIDR prefix blocks—for the Americas, Europe, Asia, and other geographic regions and the corresponding indicators—here, RTTs—for each web server 10a–b, although the RR table 46 may initially contain no entries. RTTs are discussed here, but any connection or performance metric may be used. If a match exists for the client CIDR prefix in the RR table 46, the CMPS 18 chooses (56) the web server 10a–b listed first in the RR table 46 and routes (58, 60) the client browser 44 to that web server 10a–b as described above.

If, however, a match does not exist in the RR table 46, the CMPS checks (74) a learning redirector (LR) table 47 for a match. The LR table 47 is essentially a collection of data stored on or accessible by the CMPS 18 and/or the primary web server 10a. The LR table 47 includes an index of CIDR prefixes (or the addresses or partial addresses included in the RR table 46) and any known RTTs (or the connection speed or performance indicator appearing in the RR table 46) corresponding to any of the web servers 10a–b, the web servers 10a–b being noted as previously connected to by a client browser with that CIDR prefix ("done") or not ("not done"). The LR table 47 is "learning" the fastest service for CIDR prefixes in that as client browsers with different CIDR prefixes connect with different web servers 10a–b, the LR table 47 "learns" the RTT associated with each of the web servers 10a–b for each CIDR prefix. The web servers 10a–b marked as "done" include those with known RTT values, either a well-known value or a value known through experience, e.g., a client browser having that CIDR prefix was previously routed to that web server 10a–b. Once each web server 10a–b has a corresponding RTT in the LR table 47, the CMPS 18 can copy the entries into the RR table 46, rearranging the web server order if necessary to put the web servers 10a–b in order from fastest service to slowest service. The copying indicates that the CMPS 18 has "learned" which of the web company's web servers 10a–b provide the fastest service and that future HTTP requests coming from that CIDR prefix can be routed to the web server 10a–b providing the fastest service as indicated in the RR table 46.

If a match for the client CIDR prefix exists in the LR table 47, the CMPS 18 performs (76) a round robin among the web servers 10a–b noted as "not done." The round robin operation can incorporate any round robin technique. Generally, the round robin operation includes routing client browsers to the web servers 10a–b on a rotating basis, so that the web servers 10a–b are chosen as "winners" in each round of a round robin procedure in a fixed order. In this case, the next web server 10a–b in the LR table 47 marked as "not done" may win a round in the round robin and have its status change to "done." The CMPC 20 for the round-winning web server (the web server chosen/scheduled in a round of the round robin) could notify (78) the CMPS 18 of the RTT between the client CIDR prefix and the round-winning web server 10a–b, and the CMPS 18 can add (80) this RTT to the LR table 47. However, the CMPC 20 could wait until the CMPS 18 requests the RTT data as explained further below. Of course, if the primary server 10a wins the round in the round robin, the notification (78) is not necessary. The CMPC 20 also adds this RTT to its own learning table 48 as discussed below. The CMPS 18 then routes (58, 60) the client to the chosen web server 10a–b as described above.

If a match for the client CIDR prefix does not exist in the LR table 47, the CMPS 18 adds (82) an entry in the LR table 47 for the client CIDR prefix (or the addresses or partial addresses included in the RR table 46). The CMPS 18 also sends (84) a message to the CMPC 20 (and any other CMPCs associated with the web company's additional secondary web servers) to add (86) an entry in its learning table 48 for the client CIDR prefix. Each CMPC has its own learning table, which is essentially a database stored on or accessible by the CMPC and/or the secondary web server associated with the CMPC. The CMPS 18 may add (82) and send (84) in any order. Each learning table includes an index of CIDR prefixes (or the addresses or partial addresses included in the RR table 46 and the LR table 47), the RTT between the CIDR prefix and the secondary web server 10b (or the connection speed or performance indicator appearing in the RR table 46 and the LR table 47), RTT tolerance for the secondary web server (or tolerance indicator for the connection speed or performance indicator in the RR table 46 and the LR table 47), and a status of "learning" or "resolved" for each CIDR prefix. The RTT tolerance indicates a maximum percentage amount that the RTT may vary from another web server's RTT and be considered the same RTT. The RTT tolerance values in each learning table may vary and may equal a default value if neither the CMPC associated with the learning table nor the CMPS 18 is configured to provide a particular value. The status indicates if the CMPS 18 has "learned" which web server 10a–b provides the CIDR prefix with the fastest service ("resolved"), i.e., the CIDR prefix now appears in the RR table 46, or not ("learning"). When the CMPC 20 adds (86) the client CIDR prefix to a learning table, it has a status of "learning."

Once the CMPS 18 adds (82) an entry for the client CIDR prefix in the LR table 47, the CMPS 18 may perform (88) a round robin among all of the web servers 10a–b. The CMPC 20 for the round-winning-web server adds (90) the RTT between the client CIDR prefix and the round-winning web server to its learning table 48. This CMPC could also notify (92) the CMPS 18 of this RTT, and the CMPS 18 can add (94) this RTT to the LR table 47, although the CMPC 20 may wait until the CMPS 18 requests the RTT data as described below. The CMPS 18 then routes (58, 60) the client browser 44 to the chosen web server 10a–b as described above.

Figure 5:
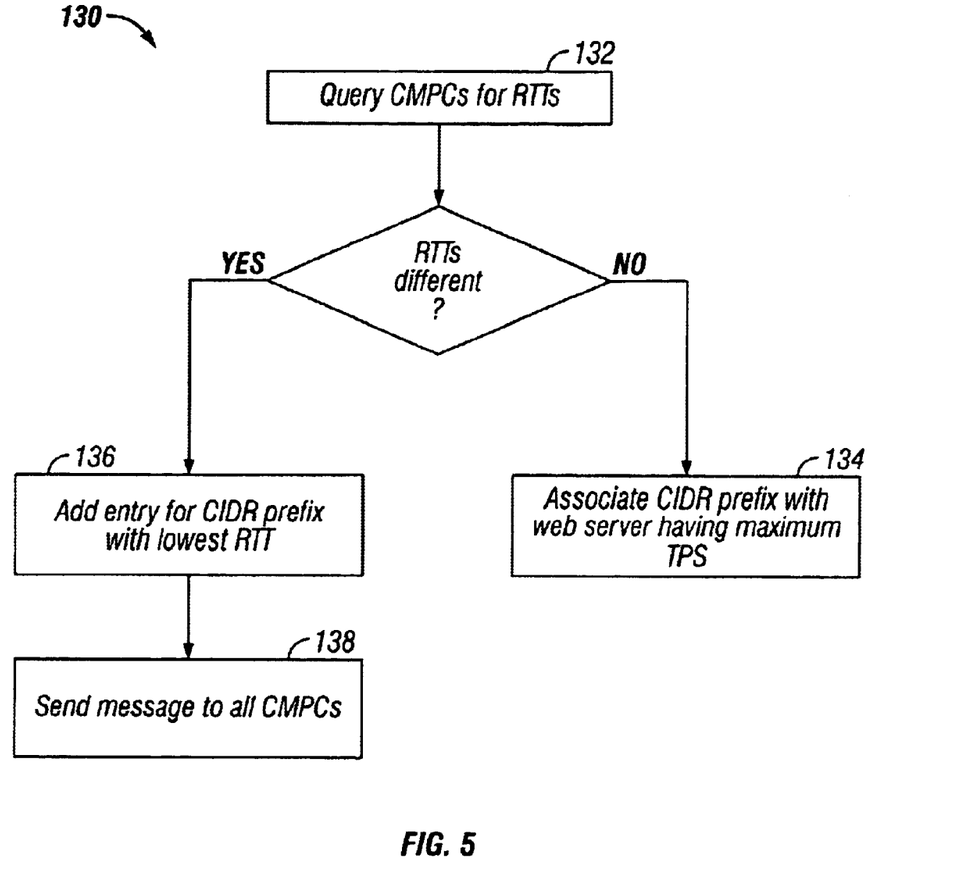

Referring also to FIG. 5, when all of the web servers 10a–b for a CIDR prefix are marked as "done" in the LR table 47, meaning that all of the web servers 10a–b have a known RTT, the CMPS 18 determines (130) which web server 10a–b provides the most desirable service to that CIDR prefix within the specified RTT tolerance level. If the CMPS 18 has not been receiving RTT data as web servers 10a–b win rounds in the round robin the CMPS 18 queries (132) each CMPC, here only the CMPC 20, to determine the RTT values for each web server 10a–b for the CIDR prefix.

If two or more web servers 10a–b can provide the same fastest RTT, then the CMPS 18 associates (134) the CIDR prefix with the web server 10a–b among these web servers 10a–b that can handle the most transactions per second (TPS) or meets some other tie-breaking criteria. For example, if the RTT for the primary web server 10a equals 150 milliseconds (ms) and the RTT equals 162 ms for the secondary web server 10b, the web servers 10a–b provide the same service given a fifteen percent RTT tolerance for the secondary web server's RTT (because the second fastest service with the secondary web server 10b is within fifteen percent of the fastest service given by the primary web server 10a). The primary web server 10a, however, may provide twenty TPS to the secondary web server's fifteen TPS, so the CMPS 18 would associate (134) the primary web server 10a with the CIDR prefix. If the server farm included another secondary web server capable of handling twenty-four TPS and providing a 170 ms RTT with a ten percent RTT tolerance, the CMPS 18 would still associate (134) the CIDR prefix with the primary web server 10a because 170 ms exceeds ten percent of 150 ms (the fastest RTT).

This association means that future requests from the CIDR prefix are routed to its associated web server, determined using a load balancing technique. Generally, the load balancing technique routes the request to the web server most able to handle it, here measured by TPS. However, since no one web server 10a–b provides the fastest service to the CIDR prefix, the CMPS 18 does not copy the data for the CIDR prefix from the LR table 47 to the RR table 46 and the CMPCs do not change the status of the CIDR prefix to "resolved" in the learning tables. The CMPCs may be configured to update the RTTs in the learning tables and notify the CMPS 18 of any changes. The CMPS 18 may be similarly configured to update the RTTs in the LR table 47 and thereby determine the web server providing the fastest service to a particular CIDR prefix.

If one web server 10a–b has an RTT indicating the fastest service for the CIDR prefix, i.e., has the fastest connection speed or greatest performance given all of the RTTs and RTT tolerances, then the CMPS 18 adds (136) an entry for the CIDR prefix in the RR table 46. This addition indicates that the CMPS 18 has identified the web server 10a–b providing the fastest service to that CIDR prefix. The CMPS 18 may delete the data for this CIDR prefix from the LR table 47, though if the web company adds or removes web servers 10a–b to or from the server farm, the data would need to be reentered in the LR table 47, so preferably the data remains in the LR table 47. The CMPS 18 also sends (138) a message to all of the CMPCs instructing the CMPCs to change the status of the CIDR prefix from "learning" to "resolved" in the learning tables. The CMPC 20 preferably does not remove the CIDR prefix and associated information from the learning table because if the web company adds one or more new secondary web servers to the server farm, the status of "resolved" CIDR prefixes may change back to "learning."

If the web company adds another web server to the server farm, the CMPS 18 receives notification of the new web server from the new web server's CMPC, whereas the existing CMPCs do not. Similarly, if the web company removes a web server from the server farm, only the CMPS 18 receives notification and modifies its tables 46 and 47 accordingly. The new CMPC sends a message to the CMPS 18 indicating its presence. In response, the CMPS 18 adds the new web server to the LR table 47 with a status of "not done" for each CIDR prefix. The CMPC associated with the new web server adds an entry for each CIDR prefix (sent to it by the CMPS 18) with a status of "learning." This new web server may provide the fastest service to one or more CIDR prefixes already listed in the RR table 46 and marked as resolved in the learning tables of the CMPCs. Thus, the CMPS 18 and the CMPCs should be adapted to "relearn" which web server best serves each CIDR prefix.

Two "relearning" techniques that the CMPS 18 and the CMPCs may use alone or in tandem include periodically reviewing the web servers for performance and determining when a certain prefix block experiences inconsistent performance. These techniques reflect the idea that the web company alters its server farm when the load across the server farm begins to or has become too heavy for the web servers 10a–b to handle or when the web company desires to change its geographic presence to better serve clients across various geographic regions.

Reviewing the web servers for performance includes periodically directing the CMPS 18 to move the contents (with or without the associated RTTs) of the RR table 46 to the LR table 47 so any new web servers can be incorporated into the round robin (and also so the CMPS 18 can recheck the RTTs for the CIDR prefixes if the LR table 47 does not receive the. RTTs from the RR table 46 and thus have some known RTTs for some or all CIDR prefixes). The contents may be moved as a whole or certain portions may be moved on a rolling basis. Similarly, the contents of the RR table 46 may all be moved at the same or at different time intervals, e.g., every ten hours, every seven days, etc.

Determining when a certain CIDR prefix block experiences inconsistent performance includes each CMPC checking the RTT (or whatever connection speed or performance indicator appears in the RR table 46, the LR table 47, and the learning tables) for all or a random sampling of incoming clients within a certain time window every X days (or hours or weeks or any time measure appropriate for the amount of client traffic in the server farm). If a CMPC detects a CIDR prefix having a RTT varying over a certain threshold value from the RTT for that CIDR prefix in its learning table, the CMPC notifies the CMPS 18. For example, a CMPC may have 175 ms listed as the RTT for the CIDR prefix 142.248.0.0/18 and notice that the CIDR prefix 142.248.30.0/22 experiences a RTT closer to 225 ms. Given a 25 ms threshold value, the CMPC would change the status of that CIDR prefix from "resolved" to "learning" (if necessary) and notify the CMPS 18 that the CIDR prefix 142.248.30.0/22 needs "relearning." The CMPS 18 "relearns" the preferred web server for the 142.248.30.0/22 CIDR prefix by removing it from the RR table 46 (if necessary) and adding it to the LR table 47. Now the CMPS 18 can incorporate the new web server in the round robin scheme and possibly associate the new web server with this CIDR prefix.

This "relearning" process highlights the "learning" capability of the CMPS 18 and CMPCs in general. As HTTP requests 24 encounter the CMPS 18, the CMPS 18 determines the lowest-level CIDR prefix for the client that sent the HTTP request 24 included in the RR table 46 or in the LR table 47 or the highest-level CIDR prefix for that client not included in either table. In this way, the CMPS 18 can more quickly determine which web server to route requests to because the more clients having a certain CIDR prefix, the faster CMPS 18 can complete the round robin among the web servers in the server farm for that CIDR prefix. As the CMPCs notice inconsistent performance in the higher-level CIDR prefix, the smaller CIDR prefix blocks included in the higher-level CIDR prefix block can receive better performance by being routed to a different web server. In order to accomplish this, when the CMPS 18 checks the RR table 46 for a match (and the LR table 47 if necessary), it checks for the lowest level CIDR prefix for a client first and then progressively higher level CIDR prefixes.

Even if a CMPC notes a particular CIDR prefix group as experiencing inconsistent performance, however, the CMPS 18 may not necessarily proceed to "relearn" a better-performance web server. Before proceeding with a "relearning" technique, the CMPS 18 may check the number of HTTP requests it receives from clients in the CIDR prefix in a certain block of time, e.g., one hour, over a number of such time blocks. Only if the CMPS 18 receives an average of HTTP requests over a certain threshold value, e.g., fifty HTTP requests per hour, does the CMPS 18 proceed with the "relearning" technique because a significant number of hosts would be affected. For example, if the CMPS 18 receives an average of ten HTTP requests per hour from a CIDR prefix, that CIDR prefix may serve a relatively small number of hosts, whereas receiving one hundred HTTP requests per hour from a CIDR prefix indicates that the CIDR prefix may be for a server serving a relatively large number of hosts.

Other embodiments are within the scope of the following claims.

What is claimed is:

1. A method comprising:

determining, at a first server, to which one Cf N mirrored servers a request from a client should be routed based at least in part on an address indicating the client and a route to the client and on the quality of service between at least some of the N mirrored servers to the client;

determining to route requests from other clients associated with the address to the one of the N mirrored servers; and determining if other clients associated with the address and routed to the one of the N mirrored servers experience different connection performance than the client, and if so, isolating the ones of the clients experiencing the different connection performance and directing the ones of the clients to another one of the N mirrored servers.

2. The method of claim 1 further comprising using an end to end connection speed between each of the at least some of the N mirrored servers and the client to define the quality of service between the at least some of the N mirrored servers to the client.

3. The method of claim 1 in which a connection metric value between each of the at least some of the N mirrored servers and the client defines the quality of service between each of the at least some of the N mirrored servers to the client.

4. The method of claim 3 in which the connection metric value includes a round-trip time value.

5. The method of claim 1 in which the address includes an Internet Protocol address.

6. The method of claim 1 in which the address includes an Internet Protocol address on a network using classless inter-domain routing.

7. The method of claim 1 in which the part of the address indicating a route to the client is not identifiable by inspection of the address.

8. The method of claim 1 further comprising routing the request to the one of the N mirrored servers providing the fastest connection speed between the client and any of the at least some of the N mirrored servers.

9. The method of claim 1 further comprising determining if the one of the N mirrored servers can handle the load routed to it, and if not, isolating a group or clients associated with the address and routed to the mirrored server by redirecting the group of clients associated with the address and connected to the mirrored server to another one of the N mirrored servers.

10. The method of claim 1 further comprising associating the address associated with the ones of the clients with the another one of the N mirrored servers and routing requests from clients associated with the address to the another one of the N mirrored servers.

11. An article comprising a machine-readable medium which stores machine-executable instructions, the instructions causing a machine to:

determine, at a first server, to which one of N mirrored servers a request from a client should be routed based at least in part on an address indicating the client and a route to the client and on the quality of service between at least some of the N mirrored servers to the client;

determine to route requests from other client associated with the address to the one of the N mirrored servers; and determine if other clients associated with the address and routed to the one of the N mirrored servers experience different connection performance than the client, and if so, to isolate the ones of the clients experiencing the different connection performance and routine the ones of the clients to another one of the N mirrored servers.

12. The article of claim 11 further causing a machine to use an end to end connection speed between each of the at least some of the N mirrored servers and the client to define the quality of service between the at least some of the N mirrored servers to the client.

13. The article of claim 11 in which a connection metric value between each of the at least some of the N mirrored servers and the client defines the quality of service between each of the at least some of the N mirrored servers to the client.

14. The article of claim 11 in which the connection metric value includes a round-trip time value.

15. The article of claim 11 in which the address includes an Internet Protocol address.

16. The article of claim 11 in which address includes an Internet Protocol address on a network using classless inter-domain routing.

17. The article of claim 11 in which the part of the address indicating a route to the client is not identifiable by inspection of the address.

18. The article of claim 11 further causing a machine to route the request to the one of the N mirrored servers providing the fastest connection speed between the client any of the at least some of the N mirrored servers.

19. The article of claim 11 further causing a machine to determine if the one of the N mirrored servers can handle the load routed to it, and if not, to isolate a group of clients associated with the address and routed to the mirrored server by redirecting the group of clients associated with the address identifier and connected to the mirrored server to another one of the N mirrored servers.

20. The article of claim 11 further causing a machine to associate the address associated with the ones of the clients with the another one of the N mirrored servers and to route requests from clients associated with the address to the another one of the N mirrored servers.

21. An article comprising a machine-readable medium which stores machine-executable instructions,: the instructions causing a machine to:

group clients associated with the same address having a topologically-significant segment and a topologically-insignificant segment into clusters;

route requests from clients in a cluster to the same one server included in the group of N mirrored servers;

detect a performance difference between two or more clients grouped in the cluster;

isolate the ones of the clients in the cluster experiencing the performance difference; and group the ones of the clients into another cluster.

22. The article of claim 21 in which the requests are routed to the one of the N mirrored servers based on quality of service between at least some of the clients and at least some of the N mirrored servers.

23. The article of claim 21 in which the topologically-significant segment of the address and the topologically-insignificant segment of the, address cannot be identified by inspecting the address in binary form.

24. The article of claim 21 in which the topologically-significant segment of the address includes information on a route to a client and the topologically-insignificant segment of the address includes information on the client.

25. The article of claim 21 further causing a computer to determine if a server in the group of N mirrored servers can handle the load routed to it, and if not, isolate a group of clients connected to the server and direct the group of clients to another server in the group of N mirrored servers.

* * * * *